(12) United States Patent
Groenewegen et al.

(10) Patent No.: US 12,498,906 B2
(45) Date of Patent: Dec. 16, 2025

(54) INLINE CONVERSATION WITH ARTIFICIAL INTELLIGENCE WITHIN CODE EDITOR USER INTERFACE

(71) Applicant: Microsoft Technology Licensing, LLC, Redmond, WA (US)

(72) Inventors: Peter Groenewegen, Sammamish, WA (US); Rohan Jagdish Malpani, Everett, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 18/332,138

(22) Filed: Jun. 9, 2023

(65) Prior Publication Data

US 2024/0411527 A1 Dec. 12, 2024

(51) Int. Cl.
*G06F 9/44* (2018.01)
*G06F 8/33* (2018.01)
*G06F 8/73* (2018.01)

(52) U.S. Cl.
CPC . *G06F 8/33* (2013.01); *G06F 8/73* (2013.01)

(58) Field of Classification Search
None
See application file for complete search history.

(56) References Cited

U.S. PATENT DOCUMENTS

| 11,442,702 B2* | 9/2022 | Smith | G06F 40/284 |
| 2013/0263086 A1* | 10/2013 | Carter | G06F 8/33 717/113 |
| 2019/0303107 A1 | 10/2019 | Kelly | |
| 2020/0097261 A1 | 3/2020 | Smith et al. | |
| 2020/0159501 A1* | 5/2020 | Bodin | H04L 67/53 |
| 2020/0167134 A1* | 5/2020 | Dey | G06F 8/65 |

OTHER PUBLICATIONS

Brake et al., Grounded Copilot: How Programmers Interact with Code-Generating Models (Year: 2022).*
Svyatkovskiy, "IntelliCode Compose: Code Generation using Transformer" (Year: 2020).*
(Continued)

*Primary Examiner* — Insun Kang
(74) *Attorney, Agent, or Firm* — Workman Nydegger

(57) ABSTRACT

A computer system provides a context for a source code document to an artificial intelligence (AI) model and obtains a first suggested edit at a first source code location. At a code editor user interface (UI), the computer system presents a first chat indicator at the first source code location. Based on user interaction with the first chat indicator, the computer system presents the first suggested edit and receives a user response. The computer system provides an updated context to the AI model. The updated context comprises the context and the user response. The computer system obtains a second suggested edit at a second source code location. At the code editor UI, the computer system presents a second chat indicator at the second source code location. Based on user interaction with the second chat indicator, the computer system presents the second suggested edit.

18 Claims, 10 Drawing Sheets

(56) References Cited

OTHER PUBLICATIONS

Kmecl, Tim, "ChatGPT: write and improve code using AI", Retrieved From: https://marketplace.visualstudio.com/items?itemName=timkmecl.chatgpt, Dec. 7, 2022, 4 Pages.

McNutt, et al., "On the Design of AI-powered Code Assistants for Notebooks", In Repository of arXiv:2301.11178v1, Jan. 26, 2023, 18 Pages.

Ross, et al., "The Programmer's Assistant: Conversational Interaction with a Large Language Model for Software Development", In Repository of arXiv:2302.07080v1, Feb. 14, 2023, 43 Pages.

International Search Report and Written Opinion received for PCT Application No. PCT/US2024/030673, Aug. 19, 2024, 17 pages.

Ross, et al., "The Programmer's Assistant: Conversational Interaction with a Large Language Model for Software Development", Proceedings of the 28th International Conference on Intelligent User Interfaces, Mar. 27, 2023, pp. 491-514.

* cited by examiner

```
Code Editor                                              — □ X

File  Edit  Selection  View  Go  Run  Terminal  Window  Help 301
01  using System;
02
03  public class Person {
04
05      public string FirstName { get; private set; }
06      public string LastName { get; private set; }
07
08      public Person(string first, string last)
09      {
10          FirstName = first;
11          LastName = last;
12      }
13
14      public override string ToString()
15      {
16          return FirstName + " " + Lastname          304
17      }
18
19      public string AllCaps()
20      {
21          FirstName = FirstName.ToUpper();
22          LastName = LastName.ToUpper();
23          return ToString();
24      }
25  }
26
27  public class Program
28  {
29      public static void Main()
30                          302
31
32
33
```

Code Editor   — □ ×

File  Edit  Selection  View  Go  Run  Terminal  Window  Help

301

```
01  using System;
02
03  // Defines a Person class, including a FirstName and a LastName
04  public class Person
05  {
06      public string FirstName { get; private set; }
07      public string LastName { get; private set; }
08
09      public Person(string first, string last)
10      {
11          FirstName = first;
12          LastName = last;
13      }
14
15      public override string ToString()
16      {
17          return FirstName + " " + LastName;
18      }
19
20      public string AllCaps()
21      {
22          FirstName = FirstName.ToUpper();
23          LastName = LastName.ToUpper();
24          return ToString();
25      }
26  }
27
28  public class Program
29  {
30      public static void Main()
```

302

303

304

306

*Comments*
[TAB] to add comment

Please include today's date in comments

FIG. 3C

```
01  using System;
02
03  // Defines a Person class, including a FirstName and a LastName
04  // Added: May 30, 2023          303
05  public class Person
06  {
07      public string FirstName { get; private set; }
08      public string LastName { get; private set; }
09
10      public Person(string first, string last)
11      {
12          FirstName = first;
13          LastName = last;
14      }
15
16      public override string ToString()
17      {
18          return FirstName + " " + LastName;          304
19      }
20
21      public string AllCaps()
22      {
23          FirstName = FirstName.ToUpper();
24          LastName = LastName.ToUpper();
25          return ToString();
26      }
27  }
28
29  public class Program
30  {
31      public static void Main()
32              302
33
```

FIG. 3D

```
300e                        Code Editor                              – ☐ ✕
 File  Edit  Selection  View  Go  Run  Terminal  Window  Help        301
 07   public string FirstName { get; private set; }
 08   public string LastName { get; private set; }
 09
 10   public Person(string first, string last)
 11   {
 12       FirstName = first;
 13       LastName = last;
 14   }
 15
 16   public override string ToString()
 17   {
 18       return FirstName + " " + LastName;   ◀── 304
 19   }
 20
 21   public string AllCaps()
 22   {
 23       FirstName = FirstName.ToUpper();
 24       LastName = LastName.ToUpper();
 25       return ToString();
 26   }
 27   }
 28   public class Program
 29   {    ◀── 303
 30   public static void Main()
 31   {
 32       var p = new Person("Bill", "Wagner");
 33       Console.WriteLine("The name, in all caps: " + p.AllCaps());
 34       Console.WriteLine("The name: " + p);
 35   }    ◀── 302
 36   }
 37
 38
```

Code Editor

File  Edit  Selection  View  Go  Run  Terminal  Window  Help

301

```
07  public string FirstName { get; private set; }
08  public string LastName { get; private set; }
09
10  public Person(string first, string last)
11  {
12      FirstName = first;
13      LastName = last;
14  }
15
16  public override string ToString()
17  {
18      return FirstName + " " + LastName;         ◄── 304
19  }
20
21  public string AllCaps()
22  {
23      FirstName = FirstName.ToUpper();
24      LastName = LastName.ToUpper();
25      return ToString();
26  }
27  }
28  public class Program
29  {
30      ┌─ 303
31      ■ p                                             ");
32  {    ┌──────────────────────── 306 ──┐l caps: " + p.AllCaps());
33      │ Comments                       │ );
34      │ [TAB] to add comment           │
35      │ ┌────────────────────────────┐ │
36  }   │ │                            │ │
37      │ └────────────────────────────┘ │
38      └────────────────────────────────┘
```

*FIG. 3F*

```
07  public string FirstName { get; private set; }
08  public string LastName { get; private set; }
09
10  public Person(string first, string last)
11  {
12      FirstName = first;
13      LastName = last;
14  }
15
16  public override string ToString()
17  {
18      return FirstName + " " + LastName;   ← 304
19  }
20
21  public string AllCaps()
22  {
23      FirstName = FirstName.ToUpper();
24      LastName = LastName.ToUpper();
25      return ToString();
26  }
27  }
28
29  public class Program
30  {
31      // Main method, creates and prints a Person
32      // Added: May 30, 2023  ← 303
33      public static void Main()
34      {
35          var p = new Person("Bill", "Wagner");
36          Console.WriteLine("The name, in all caps: " + p.AllCaps());
37          Console.WriteLine("The name: " + p);
38      }  ← 302
39  }
```

INLINE CONVERSATION WITH ARTIFICIAL INTELLIGENCE WITHIN CODE EDITOR USER INTERFACE

BACKGROUND

Modern integrated development environments (IDEs) include programmer assistance features that aim to improve the developer experience by providing intelligent code suggestions, auto-completion, and error detection. For example, INTELLISENSE from MICROSOFT CORPORATION is a code completion and suggestion feature found in IDEs like VISUAL STUDIO. INTELLISENSE provides context-aware suggestions based on the programming language being used in a project, the libraries or frameworks integrated into the project, and the variables and functions already defined in the project. INTELLICODE, also from MICROSOFT CORPORATION, is an artificial intelligence-powered extension to INTELLISENSE that leverages machine learning models to suggest the most likely code completions based on patterns and practices observed in other software projects.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including providing a first context for a source code document being presented at a code editor user interface (UI) to an artificial intelligence (AI) persona; obtaining, from the AI persona, a first prediction including a first suggested edit at a first location within the source code document; presenting a first chat indicator at the code editor UI at the first location within the source code document; presenting the first suggested edit at the code editor UI based on a first user interaction with the first chat indicator; receiving a user response to the first suggested edit; providing an updated first context for the source code document to the AI persona, the updated first context including the first context and the user response; obtaining, from the AI persona, a second prediction including a second suggested edit at a second location within the source code document, wherein the second suggested edit is based on the user response; presenting a second chat indicator at the code editor UI at the second location within the source code document; and presenting the second suggested edit at the code editor UI based on a second user interaction with the second chat indicator.

In some aspects, the techniques described herein relate to methods, systems, and computer program products, including providing a first context for a source code document being presented at a code editor UI to an AI persona; obtaining, from the AI persona, a first prediction including a first suggested edit at a first location within the source code document; presenting a first chat indicator at the code editor UI at the first location within the source code document, including presenting an indication of the first AI persona; presenting the first suggested edit at the code editor UI based on a first user interaction with the first chat indicator; receiving a user response to the first suggested edit; providing an updated first context for the source code document to the AI persona, the updated first context including the first context and the user response; obtaining, from the AI persona, a second prediction including a second suggested edit at a second location within the source code document, wherein the second suggested edit is based on the user response; and presenting a second chat indicator at the code editor UI at the second location within the source code document, including presenting the indication of the first AI persona.

In some aspects, the techniques described herein relate to methods, systems, and computer program products, including providing a first context for a source code document being presented at a code editor UI to an AI persona; obtaining, from the AI persona, a first prediction including a first suggested edit at a first location within the source code document; presenting a first chat indicator at the code editor UI at the first location within the source code document, the first location being different from a second location within the source code document of a user cursor when presenting the first chat indicator; presenting the first suggested edit at the code editor UI based on a first user interaction with the first chat indicator; receiving a user response to the first suggested edit; providing an updated first context for the source code document to the AI persona, the updated first context including the first context and the user response; obtaining, from the AI persona, a second prediction including a second suggested edit at a third location within the source code document, wherein the second suggested edit is based on the user response; presenting a second chat indicator at the code editor UI at the third location within the source code document, the third location being different from a fourth location within the source code document of the user cursor when presenting the second chat indicator; and presenting the second suggested edit at the code editor UI based on a second user interaction with the second chat indicator.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIGS. 3A-3G illustrates an example of a code editor UIs showing inline conversations with an AI.

DETAILED DESCRIPTION

Figure 1:
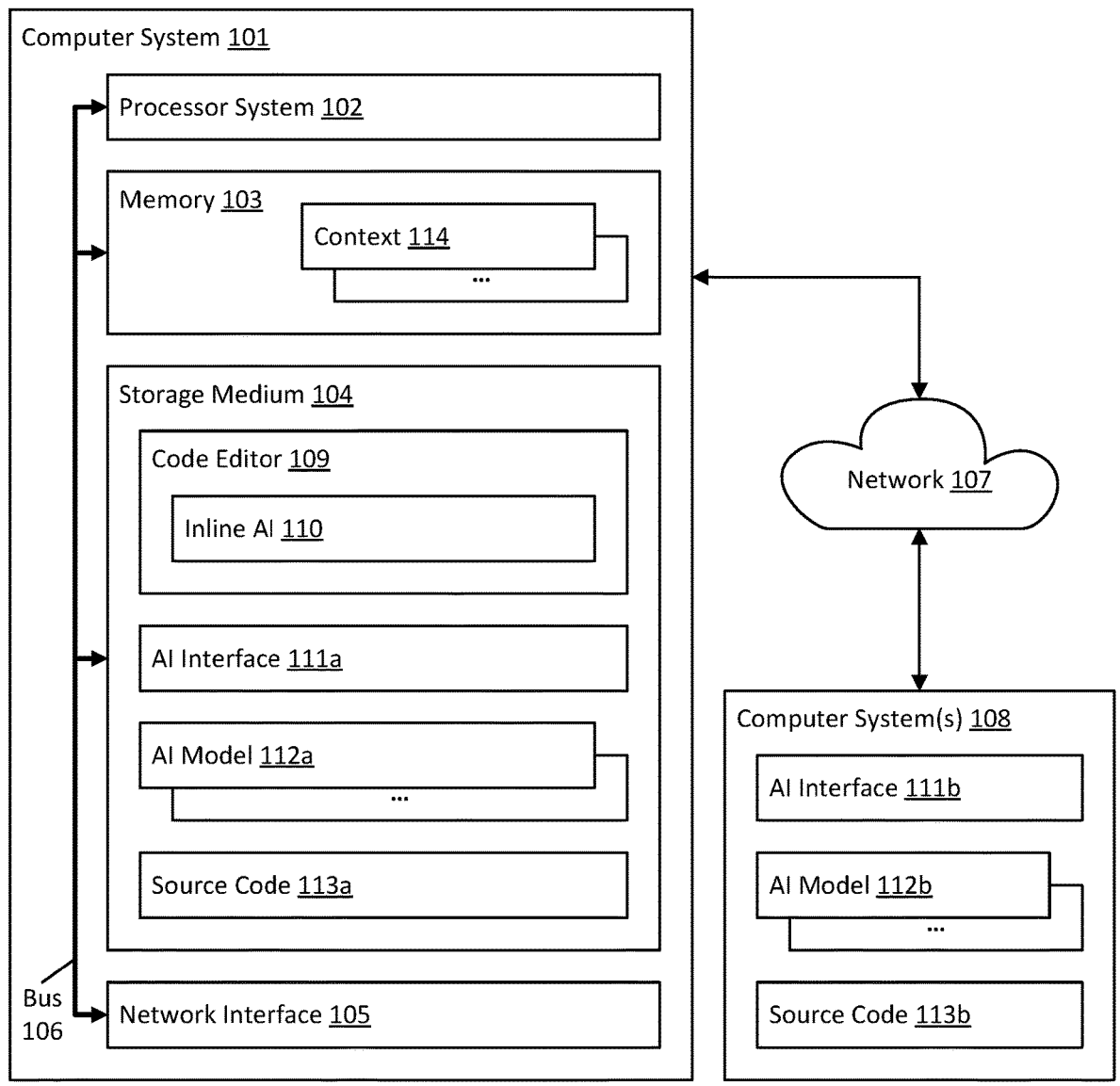
FIG. 1 illustrates an example of a computer architecture that facilitates inline conversations with an artificial intelligence (AI) within a code editor user interface (UI).

While tools such as INTELLISENSE and INTELLICODE can improve programmer efficiency and accuracy, they are limited to providing suggestions at a current focal point within a source code document. For example, these tools provide inline suggestions at the current location of the user's cursor within a source code document. To illustrate, while the user is typing a method declaration these tools may provide suggested arguments for the method. While these suggestions are timely and contextually relevant, they can be distracting and break a user's focus.

The embodiments herein are directed to providing inline conversations with an artificial intelligence (AI) within a code editor user interface (UI). These embodiments enable the AI to initiate inline conversations with the user at various points in a source code document. In embodiments, these points can be different from the user's current focal point (e.g., apart from the user's current cursor location). For example, when the AI has a suggestion for a particular source code location that is different from the user's current cursor location, embodiments present a chat indicator at that particular source code location. This chat indicator signals that the AI has a suggestion for the user that is relevant to the particular source code location. Using this chat indicator, the user can interact with the AI at this location at the user's convenience. Thus, rather than presenting the user with information relevant to the user's current cursor location, which may be distracting, the embodiments herein enable an AI to initiate inline conversations about other locations within a source code document in an unobtrusive way.

In embodiments, a user's interaction with the AI helps build context that informs the AI's future suggestions. Thus, the AI learns the user's preferences and behaviors over time. In embodiments, there are multiple AI personas, each focused on a different area of user assistance (e.g., an AI persona for code commenting, an AI persona for code refactoring, an AI persona for code syntax, an AI persona for code style, and so on). In embodiments, each AI persona is associated with its own context. Thus, each AI persona focuses on, and learns, a user's preferences and behaviors for a different area of user assistance.

In embodiments, each AI persona is associated with a distinct chat indicator that is visually distinguished from other chat indicators. In some examples, the chat indicator for each AI persona is a cursor, with each AI persona providing recommendations at each location at which its corresponding cursor is displayed. Thus, in embodiments, each AI persona appears to the user to be much like a remote pair programmer who is co-editing and reviewing the source code document as the user edits the source code document. Through each AI persona's chat indicator (e.g., cursor), the user has inline conversations with that "AI pair programmer" at relevant points in the source code document.

As used herein, reference to any type of machine learning (ML) or AI may include any type of ML algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), AI device(s), or any other type of intelligent computing system. Any amount of training data may be used (and perhaps later refined) to train the ML algorithm to dynamically perform the disclosed operations.

FIG. 1 illustrates an example of a computer architecture 100 that facilitates inline conversations with an AI within a code editor UI. As shown, computer architecture 100 includes a computer system 101 comprising a processor system 102 (e.g., a single processor or a plurality of processors), a memory 103 (e.g., system or main memory), a storage medium 104 (e.g., a single computer-readable storage medium, or a plurality of computer-readable storage media), all interconnected by a bus 106. As shown, computer system 101 may also include a network interface 105 (e.g., one or more network interface cards) for interconnecting (via a network 107) to a computer system 108 (e.g., a single computer system or a plurality of computer systems).

In FIG. 1, storage medium 104 is illustrated as storing computer-executable instructions implementing at least a code editor 109 that includes an inline AI component 110. In embodiments, code editor 109 presents a code editor UI in which a user of computer system 101 can view and edit one or more source code documents, illustrated in FIG. 1 as source code 113. In embodiments, code editor 109 interacts with source code stored at computer system 101 (e.g., source code 113a within storage medium 104), at some other computer system (e.g., computer system 108, which is illustrated as containing source code 113b), or both.

In embodiments, in connection with code editor 109 presenting a source code document of source code 113 at a code editor UI, inline AI component 110 uses the predictions of one or more AI/ML models (AI model 112) to provide suggestions regarding that source code document. In embodiments, inline AI component 110 interacts with an AI interface 111 to obtain these predictions. In embodiments, inline AI component 110 interacts with an AI at computer system 101 (e.g., AI interface 111a and AI model 112a), interacts with an AI at some other computer system (e.g., computer system 108, which is illustrated as containing AI interface 111b and AI model 112b), or both.

In embodiments, inline AI component 110 uses the predictions of one or more AI personas, such as a code commenting AI persona, a code refactoring AI persona, a code syntax AI persona, a code style AI persona, and so on. In some embodiments, each AI persona corresponds to a different AI/ML model. In some embodiments, a single AI/ML can provide distinct AI personas, such as by being supplied with a different starting prompt for each persona.

Figure 2:
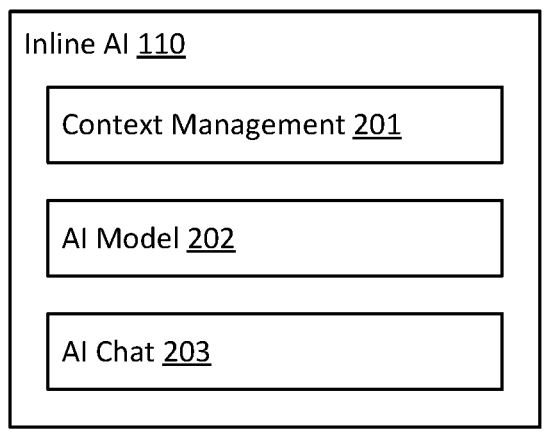
FIG. 2 illustrates an example of an AI pair programming component.

FIG. 2 illustrates an example 200 of inline AI component 110 of FIG. 1. Each component of inline AI component 110 depicted in FIG. 2 represents various functionalities that inline AI component 110 may implement under the embodiments described herein. These components—including their identity and arrangement—are presented merely as an aid in describing example embodiments of inline AI component 110.

In example 200, inline AI component 110 includes a context management component 201 that manages one or more contexts (e.g., context 114 within memory 103) that are used, at least in part, as input to an AI/ML model (e.g., as a prompt). In embodiments, context 114 includes an AI persona configuration, at least a portion of the current content of a source code document being edited within code editor 109, at least a portion of prior content of the source code document being edited within code editor 109, at least a portion of current or prior content of one or more related source code documents (e.g., documents that are part of the same project within source code 113), information about a user's prior interactions with an AI (e.g., prior conversations with the AI), and the like.

In some embodiments, context management component 201 manages a different context for each AI persona and updates each context as a user interacts with its corresponding AI persona (e.g., to integrate a user's responses to suggestions by the AI persona into that context). In other embodiments, context management component 201 manages a single context for a plurality of AI personas and updates that context as a user interacts with those AI personas (e.g., to integrate a user's responses to suggestions by those AI personas into that context). Either way, in embodiments, context management component 201 also updates each context as the source code document and/or related source code documents are modified.

In example 200, inline AI component 110 also includes an AI model component 202. In embodiments, AI model component 202 interacts with AI interface 111 to provide AI interface 111 with inputs to an AI/ML model (e.g., AI model 112) corresponding to a given AI persona. In embodiments, AI model component 202 also interacts with AI interface 111 to receive predictions from that AI/ML model. For example, AI model component 202 sends context 114 to AI interface 111 and receives a prediction from an AI persona corresponding to context 114. In embodiments, a prediction includes a particular location within a source code document (e.g., a particular character, a particular line) and a suggested edit (e.g., suggested text to add, suggested text to revise) at that particular location.

In example 200, inline AI component 110 also includes an AI chat component 203. In embodiments, AI chat component 203 presents UI elements that enable a user to interact with an AI persona via a code editor UI presented by code editor 109. In embodiments, when inline AI component 110 has received a suggestion from an AI persona (e.g., based on AI model component 202), AI chat component 203 presents a chat indicator at a location of that suggestion within a source code file. In embodiments, this chat indicator enables user interaction to receive the suggestion and otherwise interact with the AI persona (e.g., via a chat with the AI persona) at this source code location. Thus, the chat indicator enables an AI persona to initiate an inline conversation with the user at a location for which the AI persona has identified a suggestion. In one example, the chat indicator is a cursor, but a wide variety of indicators are possible (e.g., a light bulb, an arrow, a text highlight, and the like). In embodiments, when multiple AI personas are available, each AI persona has a visually distinguished chat indicator (e.g., different shapes, different colors, different adornments, and the like).

In some embodiments, AI chat component 203 removes an AI persona's chat indicator after user interaction and resolution of the AI persona's suggestion. In these embodiments, AI chat component 203 presents the chat indicator again (e.g., at a different location) when the AI persona has produced a new suggestion. In other embodiments, AI chat component 203 retains the chat indicator after the user interaction and resolution of the AI persona's suggestion. Notably, this enables the user to return to the chat indicator and further interact with the AI persona (e.g., to ask follow-up questions about the suggestion, to provide further instructions about the suggestion, to ask a question about a different source code location). In these embodiments, AI chat component 203 visually distinguishes the chat indicator to indicate whether or not a suggestion is available from the AI persona (e.g., using different visual weights, different colors, different associated shapes, and the like).

Whether or not AI chat component 203 removes or retains a chat indicator after the resolution of an AI persona's suggestion, in embodiments, AI chat component 203 provides a capability (e.g., context menu, keystroke, toolbar icon, and the like) for a user to call up an AI persona's chat indicator at any time to enable the user to interact with the AI personal. For example, a user may call up an AI persona's chat indicator at a location of interest to the user and use that chat indicator to interact with the AI persona regarding text at that location.

In embodiments, AI chat component 203 communicates user interactions to context management component 201, which integrates those user interactions into an appropriate context (e.g., context 114).

FIGS. 3A-3G illustrate example code editor UIs 300a-300g that demonstrate examples of the operation of inline AI component 110. It is to be appreciated that these examples are non-limiting and that there are a variety of ways to present an inline AI experience that is consistent with the embodiments described herein.

FIG. 3A shows a code editor UI 300a in which a user has created a source code document 301 that includes a definition of a "Person" class. As indicated by cursor 302, the user is currently working on writing a Main method. In code editor UI 300a, there are two chat indicators, chat indicator 303 and chat indicator 304. In this example, chat indicator 303 corresponds to a code-commenting AI persona, and chat indicator 304 corresponds to a code-fixing AI persona. Chat indicator 303 and chat indicator 304 are each shown as visually distinguished cursors (e.g., chat indicator 303 is adorned with a half-circle to indicate it corresponds to the code-commenting AI persona, while chat indicator 303 is adorned with a triangle to indicate it corresponds to the code-fixing AI persona).

Figure 3B:
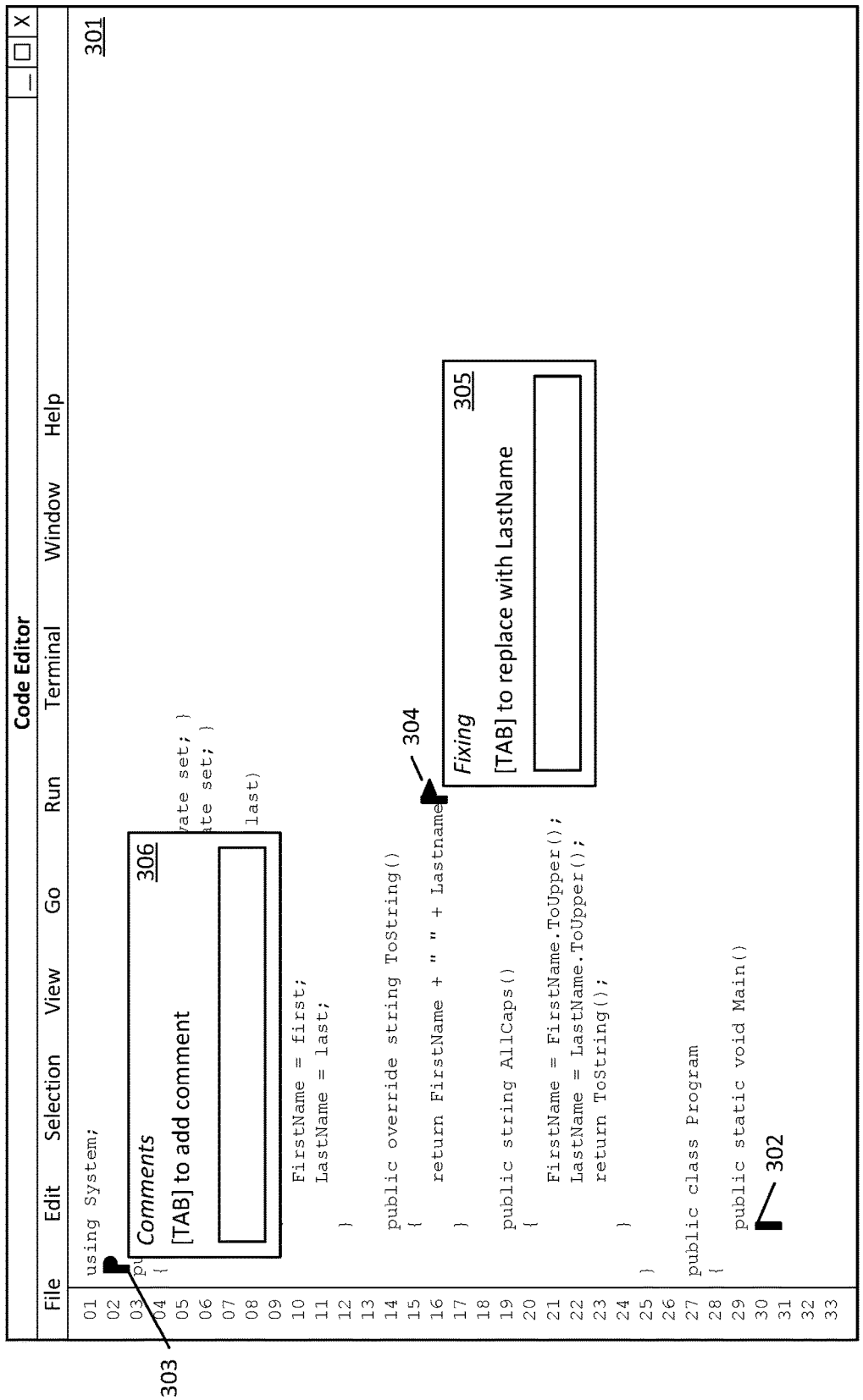

In FIG. 3B, code editor UI 300b shows that a user has interacted with each of chat indicator 303 and chat indicator 304. A chat window 306 associated with chat indicator 303 shows that the code-commenting AI persona has initiated a conversation to suggest adding a comment to the Person class, while a chat window 305 associated with chat indicator 304 shows that the code-fixing AI persona has initiated a conversation to suggest a correction to the variable "Lastname."

In FIG. 3C, code editor UI 300c shows that the user has accepted each suggestion from the corresponding AI persona, resulting in the code-commenting AI persona adding a comment to the Person class and in the code-fixing AI persona fixing the variable "Lastname" to "LastName" (as the variable is used elsewhere). Additionally, code editor UI 300c shows that the user has further interacted with chat indicator 303 to request that the code-commenting AI persona add today's date to its comments. In FIG. 3C, code editor UI 300d reflects the addition of a date by the code-commenting AI persona to the previously added comment on the Person class.

In FIG. 3E, code editor UI 300e shows that the user has completed authoring the Main method, with cursor 302 being positioned at the end of the method declaration. Now, chat indicator 303 is presented at the beginning of the Main method. In FIG. 3F, code editor UI 300f shows that the code-commenting AI persona has suggested the addition of a comment to the method. In FIG. 3G, code editor UI 300g illustrates the addition of this comment by the code-commenting AI persona. Notably, here, the code-commenting AI persona has automatically added today's date to the comment based on the prior feedback/instruction from the user.

Embodiments are now described in connection with FIG. 4, which illustrates a flow chart of an example method 400 for presenting inline conversations with an AI within a code editor UI. In embodiments, instructions for implementing method 400 are encoded as computer-executable instructions (e.g., inline AI component 110) stored on a computer storage media (e.g., storage medium 104) that are executable by a processor (e.g., processor system 102) to cause a computer system (e.g., computer system 101) to perform method 400.

The following discussion now refers to a method and method acts. Although the method acts are discussed in specific orders or are illustrated in a flow chart as occurring in a particular order, no order is required unless expressly stated or required because an act is dependent on another act being completed prior to the act being performed.

Figure 4:
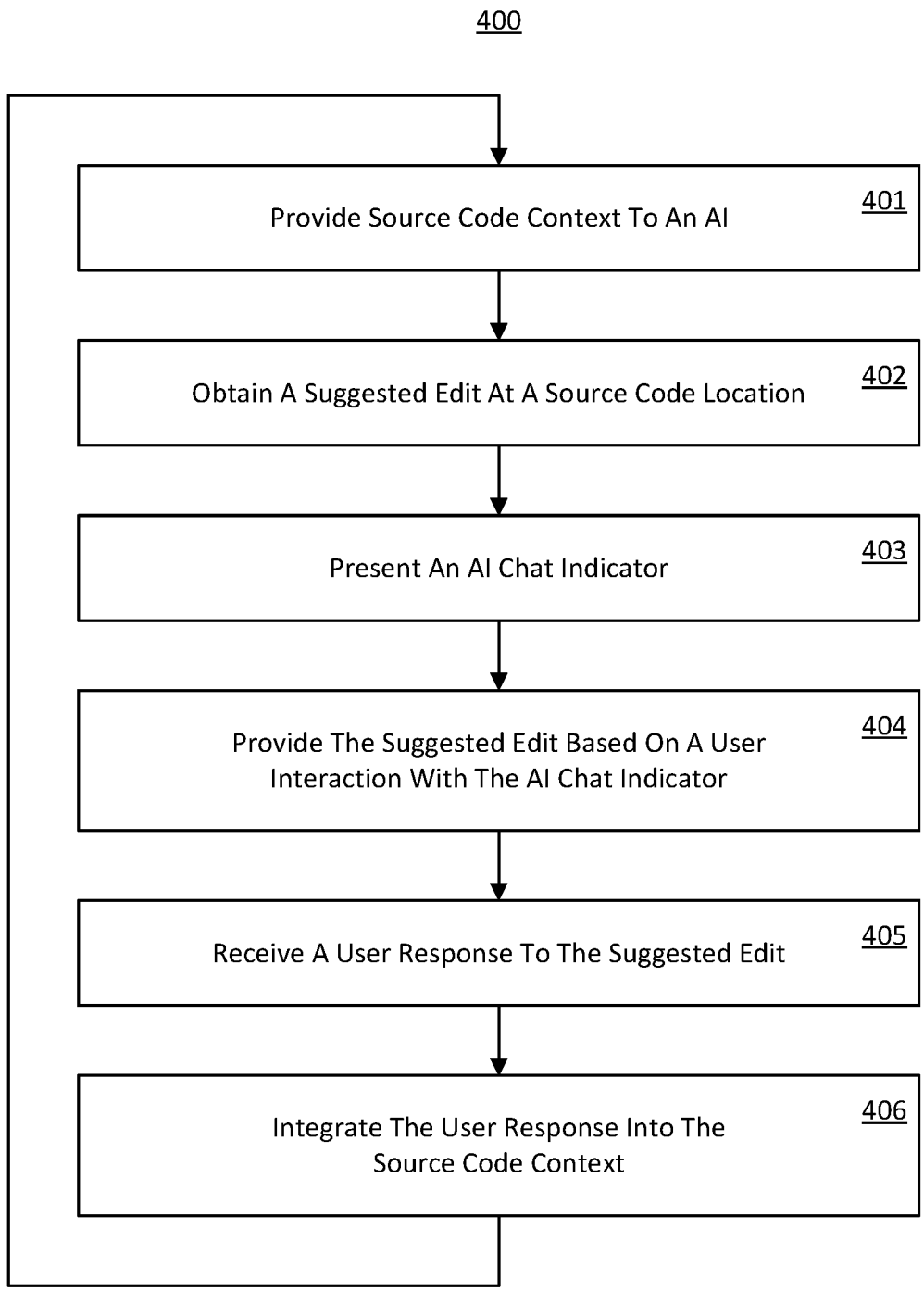
FIG. 4 illustrates a flow chart of an example of a method for presenting inline conversations with an AI within a code editor UI.

Referring to FIG. 4, in embodiments, method 400 comprises an act of providing source code context to an AI (act 401). For example, inline AI component 110 uses context management component 201 to maintain context 114 for a source code document within source code 113 that is being presented within a code editor UI presented by code editor 109. Then, inline AI component 110 uses AI model component 202 to provide context 114 to AI model 112 (e.g., as part of a prompt for AI model 112).

Method 400 also comprises an act of obtaining a suggested edit at a source code location (act 402). For example, based on providing provide context 114 to AI model 112, AI model component 202 receives a prediction from AI model 112. In embodiments, this prediction comprises a location within the source code document, as well as a suggested edit for that location.

Method 400 also comprises an act of presenting an AI chat indicator (act 403). For example, AI chat component 203 presents a chat indicator, such as a cursor, at the location indicated by AI model 112. This chat indicator indicates that the AI has a suggested edit at this location.

Method 400 also comprises an act of providing the suggested edit based on user interaction with the AI chat indicator (act 404). For example, based on user interaction with the chat indicator, AI chat component 203 presents the suggested edit to the user (e.g., within an AI-specific chat window).

Method 400 also comprises an act of receiving a user response to the suggested edit (act 405). For example, a user may accept the suggested edit, reject the suggested edit, provide additional instructions, etc.

Method 400 also comprises an act of integrating the user response into the source code context (act 406). For example, the context management component 201 integrates the user response into context 114 for use with further predictions from AI model 112. In method 400, an arrow connecting acts 406 and 401 indicates that method 400 can repeat using this updated context.

An example application of method 400 is now provided in connection with example code editor UIs 300a-300g. Referring first to act 401, in embodiments, act 401 comprises providing a first context for a source code document being presented at a code editor UI to an AI persona. For example, AI model component 202 provides context 114 relevant to source code document 301 to AI model 112. In embodiments, this first context comprises a configuration of the AI persona (e.g., as a code-commenting AI persona), the content of source code document 301, prior content of source code document 301, the content of a related source code document, or prior user interaction with the AI persona, and the like.

Referring to act 402, in embodiments, act 402 comprises obtaining, from the AI persona, a first prediction comprising a first suggested edit at a first location within the source code document. For example, AI model component 202 receives, from a code-commenting AI persona, a prediction of a suggested comment to be added prior to the class definition of the Person class within source code document 301.

Referring to act 403, in embodiments, act 403 comprises presenting a first chat indicator at the code editor UI at the first location within the source code document. For example, code editor UI 300a shows that AI chat component 203 has presented chat indicator 303 at line 02, just prior to the class definition of the Person class.

Referring to act 404, in embodiments, act 404 comprises presenting the first suggested edit at the code editor UI based on a first user interaction with the first chat indicator. For example, code editor UI 300b shows that, based on user interaction with chat indicator 303, AI chat component 203 has presented chat window 306 for the code-commenting AI persona, which provides the suggestion to add a comment.

Referring to act 405, in embodiments, act 405 comprises receiving a user response to the first suggested edit. For example, code editor UI 300c shows that the user has accepted the suggestion to add the code-commenting AI persona's suggested comment. Additionally, code editor UI 300c shows that the user has provided further instruction to add today's date to the comments.

Referring to act 406, in embodiments, act 406 comprises integrating the user response into the first context to create an updated first context. For example, the context management component 201 integrates the user's suggestion to add today's date to comments into context 114.

Following the arrow from act 406 to act 401, in embodiments, a second instance of act 401 comprises providing the updated first context for the source code document to the AI persona, the updated first context comprising the first context, and the user response. For example, context management component 201 provides context 114 to AI model 112, with context 114 having been updated in act 406 with the user's suggestion to add today's date to the comments.

In embodiments, a second instance of act 402 comprises obtaining, from the AI persona, a second prediction comprising a second suggested edit at a second location within the source code document, wherein the second suggested edit is based on the user response. For example, AI model component 202 receives, from a code-commenting AI persona, a prediction of a suggested comment to be added prior to the Main method definition within source code document 301.

In embodiments, a second instance of act 403 comprises presenting a second chat indicator at the code editor UI at the second location within the source code document. For example, code editor UI 300e shows that AI chat component 203 has presented chat indicator 303 at line 30, just prior to the Main method definition.

In embodiments, a second instance of act 404 comprises presenting the second suggested edit at the code editor UI based on a second user interaction with the second chat indicator. For example, code editor UI 300f shows that, based on user interaction with chat indicator 303, AI chat component 203 has presented chat window 306 for the code-commenting AI persona, which provides the suggestion to add a comment. As shown in code editor UI 300f, this suggestion has integrated the user's instruction to include today's date.

As discussed, in embodiments, a chat indicator is a cursor. Thus, in some embodiments, the first chat indicator (e.g., chat indicator 303 as shown in code editor UI 300a) and the second chat indicator (e.g., chat indicator 303 as shown in code editor UI 300e) is a cursor corresponding to the AI persona.

As shown in these examples, the chat indicators are presented at locations that are different from the user's cursor. Thus, in some embodiments, the first location (e.g., the location of chat indicator 303 within source code document 301 in code editor UI 300a) is different from a third location (e.g., the location of cursor 302 within source code document 301 in code editor UI 300a) within the source code document of a user cursor when presenting the first chat indicator. Additionally, in some embodiments, the second location (e.g., the location of chat indicator 303 within source code document 301 in code editor UI 300e) is different from a fourth location (e.g., the location of cursor 302 within source code document 301 in code editor UI 300e) within the source code document of the user cursor when presenting the second chat indicator.

As discussed, in embodiments, there are plural AI personas. Thus, in embodiments, the AI persona is a first AI persona (e.g., a code-commenting persona). Additionally, embodiments include providing a second context for the source code document to a second AI persona (e.g., a code-fixing persona), obtaining, from the second AI persona, a third prediction comprising a third suggested edit at a third location within the source code document (e.g., a suggestion to fix "Lastname" to "LastName"), and presenting a third chat indicator at the code editor UI at the third location within the source code document (e.g., chat indicator 304 within code editor UI 300a).

In embodiments, presenting the first chat indicator comprises presenting a first indication of the first AI persona, and presenting the second chat indicator comprises presenting a second indication of the second AI persona. In embodiments, the first indication of the first AI persona is visually distinct from the second indication of the second AI persona. For example, in code editor UIs 300a-300g, chat indicator 303 is a cursor adorned with a half-circle, and chat indicator 304 is a cursor adorned with a triangle.

In some embodiments, each AI persona is a different AI/ML model. Thus, in embodiments, the first AI persona is a first AI model, and the second AI persona is a second AI model. In other embodiments, a single AI/ML model can be configured as different personals (e.g., based on different initial prompts). Thus, in embodiments, the first AI persona is a first configuration of an AI model, and the second AI persona is a second configuration of the AI model. When using different AI personas, some embodiments keep different contexts for each persona. Thus, in embodiment, the first context is different from the second context.

Embodiments of the disclosure comprise or utilize a special-purpose or general-purpose computer system (e.g., computer system 101) that includes computer hardware, such as, for example, a processor system (e.g., processor system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internationally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (SaaS), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more virtual machines (VMs). During operation, VMs emulate an operational computing system, supporting an operating system (OS) and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system comprising:

providing a first context for a source code document being presented at a code editor user interface (UI) to a first artificial intelligence (AI) persona;

obtaining, from the first AI persona, a first prediction comprising a first suggested edit at a first location within the source code document;

presenting a first chat indicator at the code editor UI at the first location within the source code document, the first chat indicator including a first indication of the first AI persona;

providing a second context for the source code document to a second AI persona;

obtaining, from the second AI persona, a second prediction comprising a second suggested edit at a second location within the source code document;

presenting a second chat indicator at the code editor UI at the second location within the source code document, the second chat indicator including a second indication of the second AI persona, wherein:

the first indication of the first AI persona is visually distinct from the second indication of the second AI persona, the second chat indicator is presented simultaneously with presenting the first chat indicator, and the first location and the second location are different from each other, and the first location and the second location are each different from a third location of a cursor location within the source code document;

presenting the first suggested edit at the code editor UI based on a first user interaction with the first chat indicator;

receiving a user response to the first suggested edit; and providing an updated first context for the source code document to the first AI persona, the updated first context comprising the first context and the user response.

2. The method of claim 1, wherein the first context comprises one or more of, a configuration of the first AI persona, content of the source code document, prior content of the source code document, content of a related source code document, or a prior user interaction with the first AI persona.

3. The method of claim 1, wherein the first AI persona is a first AI model, and the second AI persona is a second AI model.

4. The method of claim 1, wherein the first AI persona is a first configuration of an AI model, and the second AI persona is a second configuration of the AI model.

5. The method of claim 1, wherein the first context is different from the second context.

6. The method of claim 1, wherein the first chat indicator is a cursor corresponding to the first AI persona and the second chat indicator is a cursor corresponding to the second AI persona.

7. A computer system comprising:

a processor system; and a computer storage media that stores computer-executable instructions that are executable by the processor system to at least:

provide a first context for a source code document being presented at a code editor user interface (UI) to a first artificial intelligence (AI) persona;

obtain, from the first AI persona, a first prediction comprising a first suggested edit at a first location within the source code document;

present a first chat indicator at the code editor UI at the first location within the source code document, the first chat indicator including a first indication of the first AI persona;
provide a second context for the source code document to a second AI persona;
obtain, from the second AI persona, a second prediction comprising a second suggested edit at a second location within the source code document;
present a second chat indicator at the code editor UI at the second location within the source code document, the second chat indicator including a second indication of the second AI persona, wherein:
the first indication of the first AI persona is visually distinct from the second indication of the second AI persona,
the second chat indicator is presented simultaneously with presenting the first chat indicator, and
the first location and the second location are different from each other, and the first location and the second location are each different from a third location of a cursor location within the source code document;
present the first suggested edit at the code editor UI based on a first user interaction with the first chat indicator; receive a user response to the first suggested edit; and
provide an updated first context for the source code document to the first AI persona, the updated first context comprising the first context and the user response.

8. The computer system of claim 7, wherein the first context comprises one or more of, a configuration of the first AI persona, content of the source code document, prior content of the source code document, content of a related source code document, or a prior user interaction with the first AI persona.

9. The computer system of claim 7, wherein the first AI persona is a first AI model, and the second AI persona is a second AI model.

10. The computer system of claim 7, wherein the first AI persona is a first configuration of an AI model, and the second AI persona is a second configuration of the AI model.

11. The computer system of claim 7, wherein the first context is different from the second context.

12. The computer system of claim 7, wherein the first chat indicator is a cursor corresponding to the first AI persona and the second chat indicator is a cursor corresponding to the second AI persona.

13. A computer program product comprising a hardware storage device that stores computer-executable instructions that are executable by a processor system to at least:
provide a first context for a source code document being presented at a code editor user interface (UI) to a first artificial intelligence (AI) persona;
obtain, from the first AI persona, a first prediction comprising a first suggested edit at a first location within the source code document;
present a first chat indicator at the code editor UI at the first location within the source code document, the first chat indicator including a first indication of the first AI persona, and the first location being different from a third location within the source code document of a user cursor when presenting the first chat indicator;
provide a second context for the source code document to a second AI persona;
obtain, from the second AI persona, a second prediction comprising a second suggested edit at a second location within the source code document;
present a second chat indicator at the code editor UI at the second location within the source code document, the second chat indicator including a second indication of the second AI persona, wherein:
the first indication of the first AI persona is visually distinct from the second indication of the second AI persona,
the second chat indicator is presented simultaneously with presenting the first chat indicator, and
the first location and the second location are different from each other, and the first location and the second location are each different from the third location of a cursor location within the source code document;
present the first suggested edit at the code editor UI based on a first user interaction with the first chat indicator;
receive a user response to the first suggested edit; and
provide an updated first context for the source code document to the first AI persona, the updated first context comprising the first context and the user response.

14. The computer program product of claim 13, wherein the first context comprises one or more of, a configuration of the first AI persona, content of the source code document, prior content of the source code document, content of a related source code document, or a prior user interaction with the first AI persona.

15. The computer program product of claim 13, wherein the first AI persona is a first AI model, and the second AI persona is a second AI model.

16. The computer program product of claim 13, wherein the first AI persona is a first configuration of an AI model, and the second AI persona is a second configuration of the AI model.

17. The computer program product of claim 13, wherein the first context is different from the second context.

18. The computer program product of claim 13, wherein the first chat indicator is a cursor corresponding to the first AI persona and the second chat indicator is a cursor corresponding to the second AI persona.

* * * * *